(12) United States Patent
Martis

(10) Patent No.: US 6,662,140 B2
(45) Date of Patent: Dec. 9, 2003

(54) FUZZY LOGIC ESTIMATOR FOR MINIMIZING SIGNAL MEASUREMENT INACCURACY EFFECTS IN A SIGNAL PROCESSING SYSTEM

(75) Inventor: Dan Martis, Montreal West (CA)

(73) Assignee: Rolls-Royce Canada Limited (CA)

( * ) Notice: Subject to any disclaimer, the term of this patent is extended or adjusted under 35 U.S.C. 154(b) by 338 days.

(21) Appl. No.: 09/879,251

(22) Filed: Jun. 12, 2001

(65) Prior Publication Data

US 2002/0188429 A1 Dec. 12, 2002

(51) Int. Cl.[7] ............................................... G06F 15/00
(52) U.S. Cl. ...................... 702/179; 702/181; 702/194; 706/22
(58) Field of Search ........................ 700/50, 52; 706/1, 706/2, 4, 8, 22; 702/179, 181, 189, 190, 194

(56) References Cited

U.S. PATENT DOCUMENTS

| | | | |
|---|---|---|---|
| 4,875,184 A | 10/1989 | Yamakawa | |
| 5,357,449 A | 10/1994 | Oh | |
| 5,524,174 A | 6/1996 | Eichfeld et al. | |
| 5,751,908 A | 5/1998 | Madau et al. | |
| 5,924,052 A | 7/1999 | Palm | |
| 5,974,350 A | 10/1999 | Davis, Jr. et al. | |
| 6,073,262 A | * | 6/2000 | Larkin et al. ............... 714/736 |

* cited by examiner

Primary Examiner—John Barlow
Assistant Examiner—Stephen J. Cherry
(74) Attorney, Agent, or Firm—Barnes & Thornburg

(57) ABSTRACT

A fuzzy logic estimator for minimizing signal measuring inaccuracy effects in a signal processing system preferably includes a microprocessor-based system operable to receive a number of measured signal values and estimate a solution to an overdetermined system of equations that minimizes differences between the measured signal values and corresponding model values. The fuzzy logic solution estimate process includes assigning a probability distribution to delta values representing differences between the measured signal values and corresponding model values to form a corresponding number of probability distribution functions, associating at least some of the probability distribution functions with each equation of a system of equations defining a number of unknown parameter values, solving the system of equations for a domain of possible solutions, and determining a unique solution for the unknown parameter values from the domain of possible solutions.

31 Claims, 9 Drawing Sheets

FUZZY LOGIC ESTIMATOR FOR MINIMIZING SIGNAL MEASUREMENT INACCURACY EFFECTS IN A SIGNAL PROCESSING SYSTEM

FIELD OF THE INVENTION

The present invention relates generally to systems for processing measured signal values, and more specifically to systems for estimating parameter values relating to a set of measured signal values based on fuzzy logic techniques.

BACKGROUND OF THE INVENTION

Systems for processing a number of measured signal values and determining a corresponding set of parameter values are known and commonly used in physical system modeling applications. Such applications are generally useful for aligning model parameters with test data resulting from the measured signal values.

An example of one known physical system modeling application 10 is illustrated in FIG. 1 and includes a physical system 12 having a number of physical processes associated therewith. A number, K, of physical process sensors $14_1$–$14_K$ are suitably disposed relative to system 12, wherein K may be any positive integer. Sensors $14_1$–$14_K$ are generally operable to sense operating conditions associated with physical system 12, and produce resulting operating condition signals ($c_i$, i=1, ... , K) on corresponding signal paths $16_1$–$16_K$. Application 10 further includes a performance analysis system 18 receiving the operating condition signals on signal paths $16_1$–$16_K$ and determining predicted performance parameters therefrom. System 18 includes a pre-processing unit 20 having a first set of inputs electrically connected to the various physical process sensors $14_1$–$14_K$ via signal paths $16_1$–$16_K$, a second number, L, of inputs electrically connected to a corresponding number, L, of outputs of a model-based parameter predictor block 30 via signal paths $36_1$–$36_L$, and a number, L, of outputs electrically connected to an equation solver 22 via a corresponding number, L, of signal paths $24_1$–$24_L$, wherein L may be any positive integer. Generally, K>L, and the pre-processor unit 20 is operable to combine one or more of the operating condition signals $c_i$, i=1, ... , K) to form a number, L, of corresponding operating parameter signals $p_j$, j=1, ... , L. The model-based parameter predictor block 36 is operable to produce L model parameter values $mp_j$, j=1, ... , L, wherein the model parameter values $mp_j$, j=1, ... , L correspond to the computed model values of the operating parameter signals $p_j$, j=1, ... , L. The pre-processor unit 20 is, in turn, operable to compute a number, L, of parameter delta values $\delta p_j$ (j=1, ... , L), wherein $\delta p_j = p_j - mp_j$, j=1, ... , L, and to produce the parameter delta values $\delta p_j$ on corresponding signal paths $24_1$–$24_L$.

System 18 further includes an equation solver block 22 having a first set of inputs receiving the parameter delta values $\delta p_j$ (j=1, ... , L) on signal paths $24_1$–$24_L$, a second set of inputs receiving a number of unknown variables $\delta x_i$ and corresponding weighting factors $W_{ji}$ from the model-based parameter predictor block 30 via a number, N, of signal paths, wherein N may be any positive integer, and a set of outputs producing a number, J, of estimated values of the unknown variables $\delta x_i$, i=1, ... , J.

The unknown variables $\delta x_i$, i=1, ... , J represent functional distortions of the various components of physical system 12. For example, where performance analysis system 18 represents an engine performance modeling application, the functional distortions $\delta x_i$ may correspond to compressor efficiency, turbine efficiency, flow capacity, pressure ratio, pressure drop, and the like, relating to one or more corresponding components of physical system 12. The weighting factors $W_{ji}$ correspond to the equation constants in the system of equations forming the particular model contained within the model-based parameter predictor block 30, wherein block 30 may include any number of models. In general, the equation solver 22 is thus operable to solve a system of equations of the form:

$$W_{ji}\delta x_i = \delta p_j,\ i=1, \ldots, J \text{ and } j=1, \ldots, L \qquad (1),$$

where, $W_{ji}=[\partial p_j/\partial x_i]$, j=1, ... , L and i=1, ... , J and define the various weighting factors linking the model parameter values $mp_i$, i=1, ... , L to the functional distortions $\delta x_i$, i=1, ... , J.

The equation solver 22 is electrically connected to a set of inputs of a post processor unit 26 via signal paths $28_1$–$28_J$, and a set of inputs/outputs of post processor unit 26 are electrically connected to a corresponding set of inputs/outputs of the model-based parameter predictor 30 via a number, M, of signal paths $32_1$–$32_M$. In general, blocks 12, 20, 22, 26 and 30 form a closed-loop equation solving system using an iterative approach to compute a solution to the system of equations defined thereby. In this regard, the post-processor unit 26 is operable to receive from the model-based parameter predictor block 30 the estimated $\delta x_i$ values from the previous iteration, to receive from the equation solver block 22 the estimated $\delta x_i$ values from the present iteration, and compute an error vector $\epsilon_k = \delta x_k - \delta x_{k-1}$, wherein k=iteration number. The post-processor block 26 is operable to halt the iterative equation solving process when $\epsilon_k$ is within a desired range, and to accordingly notify the model-based parameter predictor 30 via one of the signal paths $32_1$–$32_M$.

The model-based parameter predictor 30 is electrically connected to a model storage and/or display unit 38 via a number, R, of signal paths $40_1$–$40_R$, wherein R may be any positive integer. Unit 38 may include a display and/or printer for viewing the results of the model, and may further include a data storage unit for recording the model results.

In the ideal case, the equation solver 22 can determine the correct or true solution associated with the unknown variables $\delta x_i$ by solving any "J" of the "L" equations (assuming L>J) represented by equation (1) above. An example of such an ideal case is illustrated in FIG. 2 with L=5 and J=2. In this ideal case, the pre-processor unit 20 is operable to produce five parameter delta values ($\delta p_j$, j=1, ... , 5), based on five corresponding measured operating conditions of physical system 12, and the model produced by the model-based parameter predictor 30 has two unknowns X and Y (e.g., $\delta x_1$ and $\delta x_2$). X and Y represent ratios and are therefore dimensionless. The true solution of the resulting system of equations $15_1$–$15_5$ is defined by the intersection of equations $15_1$–$15_5$, and is indicated on the plot of FIG. 2 by the point TS. The equation solver 22, in this example, can determine TS by solving a system of any two of the five equations $15_1$–$15_5$ for the corresponding variables X and Y defining TS.

Due to limitations associated with known signal measurement instrumentation and with the physical application 10 in general, the ideal case illustrated in FIG. 2 typically does not occur. For example, measurement inaccuracies as well as model non-linearities each contribute to offsets in the measured operating condition signals on signal paths $16_1$–$16_K$, resulting in deviations in the system of equations from the true solution TS. A real-world representation of the example illustrated in FIG. 2 (e.g., L=5, J=2) is shown in FIG. 3 as a set of five system equations $17_1$–$17_5$ having two unknowns X and Y. Due to instrumentation measurement inaccuracies as well as model non-linearities, equations $17_1$–$17_5$ do not intersect at the true solution TS, but are instead offset therefrom by varying amounts as illustrated in FIG. 3.

In systems 10 of the type illustrated in FIG. 1, known Newton-type iterative techniques are typically used in the equation solver block 22 to solve the system of equations. The correction step for one such Newton technique is given by:

$$\epsilon_k = -W(x)^{-1}(\delta x_k)f(\delta x_k) \quad (2),$$

where, k represents the number of the current iteration, $\epsilon_k = \delta x - \delta x_k$ and is the correction vector representing the error between the exact solution $\delta x$ and its approximation $\delta x_k$ at the kth iteration, $W(x) = f'(x) = [\partial f_j/\partial x_i]$, j=1, ... L and i=1, ... J and f(x)=0 defines the system of non-linear equations.

For Newton-type methods, J=L such that the Jacobian matrix is square and non-singular, and the system of equations therefore has a unique solution at each iteration. The calculated solution at iteration k+1 is thus defined by:

$$\delta x_{k+1} = \delta x_k - W(x)^{-1}(\delta x_k)f(\delta x_k) \quad (3),$$

and the iterative calculations stop when $\delta x_{k+1} - \delta x_k \leq \epsilon_0$, where the error vector $\epsilon_0$ is given.

One drawback associated with the use of Newton-type iterative algorithms of the type just described is that relatively low accuracy of the measurements of the parameters of the physical system 10 introduces random noise around the ideal performance parameter values, as illustrated by example in FIG. 3, and therefore distorts any deterministic solution of a square matrix-based linear system. Thus, while the foregoing Newton technique may produce a unique solution, this solution is very sensitive to instrumentation measurement inaccuracies and spurious readings, and may therefore be grossly inaccurate. What is therefore needed is an equation solving strategy that not only minimizes model non-linearities, as with the known Newton method, but also minimizes effects of instrumentation measurement inaccuracies and spurious readings.

SUMMARY OF THE INVENTION

The foregoing shortcomings of the prior art are addressed by the present invention. In accordance with one aspect of the present invention, a method of minimizing signal measurement inaccuracy effects in a signal processing system comprises assigning a probability distribution to each of a first number of delta values to form a corresponding first number of probability distribution functions, the delta values representing differences between pairs of measured signal values and corresponding model values, associating at least some of the first number of probability distribution functions with each equation in a system of equations defining a second number of unknown parameter values, solving the system of equations for a domain of possible solutions, and determining a unique solution for the second number of unknown parameter values from the domain of possible solutions.

In accordance with another aspect of the present invention, a method of minimizing signal measurement inaccuracy effects in a signal processing system comprises measuring a plurality of signal values, computing a first number of delta values each representing a difference between one of the plurality of signal values and a corresponding model value, assigning a probability distribution to each of the first number of the delta values to form a corresponding first number of probability distribution functions, associating at least some of the first number of probability distribution functions with each equation in a system of equations defining a second number of unknown parameter values, solving the system of equations for a domain of possible solutions, and determining a unique solution for the second number of unknown parameter values from the domain of possible solutions.

In accordance with a further aspect of the present invention, a system for minimizing signal measurement inaccuracy effects in a signal processing system comprises a plurality of sensors producing a corresponding plurality of signal values indicative of operating conditions of a physical system, and a signal processing system receiving the plurality of signal values, the signal processing system including means for assigning a probability distribution to each of a first number of delta values to form a corresponding first number of probability distribution functions, the delta values representing differences between pairs of measured signal values and corresponding model values, means for associating at least some of the first number of probability distribution functions with each equation of a system of equations defining a second number of unknown parameter values, means for solving the system of equations for a domain of possible solutions, and means for determining a unique solution for the second number of unknown parameter values from the domain of possible solutions.

In accordance with still another aspect of the present invention, a system for minimizing signal measurement inaccuracy effects in a signal processing system comprises a first circuit receiving a plurality of measured signal values and producing a first number of delta values each as a difference between one of the plurality of measured signal values and a corresponding model value, and a second circuit assigning a probability distribution to each of the first number of delta values to form a corresponding first number of probability distribution functions, the second circuit associating at least some of the first number of probability functions with each equation of a system of equations defining a second number of unknown parameter values and solving the system of equations for a domain of possible solutions, the second circuit producing a unique solution for the second number of unknown parameters based on the domain of possible solutions.

One object of the present invention is to provide a system for minimizing signal measurement inaccuracy effects in a signal processing system.

Another object of the present invention is to provide such a system by including a fuzzy logic estimator for solving systems of equations defined by a number of the measured signal values.

These and other objects of the present invention will become more apparent from the following description of the preferred embodiment.

DESCRIPTION OF THE PREFERRED EMBODIMENT

Figure 1:
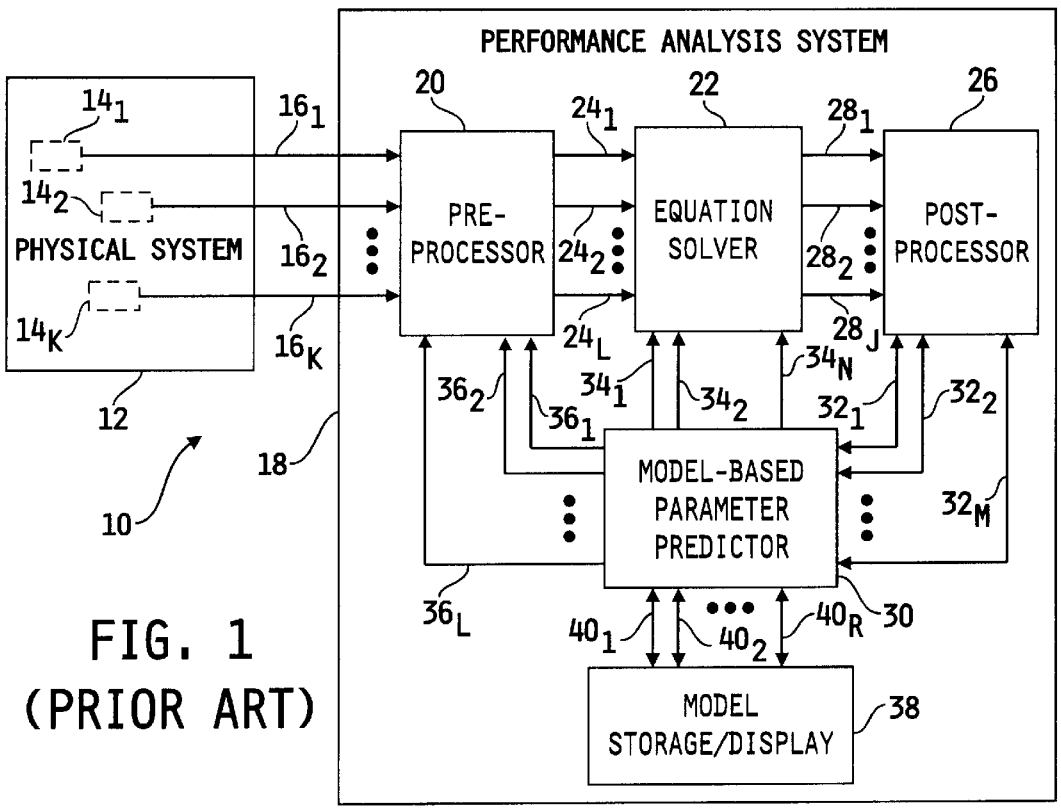
FIG. 1 is a diagrammatic illustration of a known signal processing system operable to predict a number of model parameters based on measured values of a plurality of physical system operating conditions.
Figure 2:
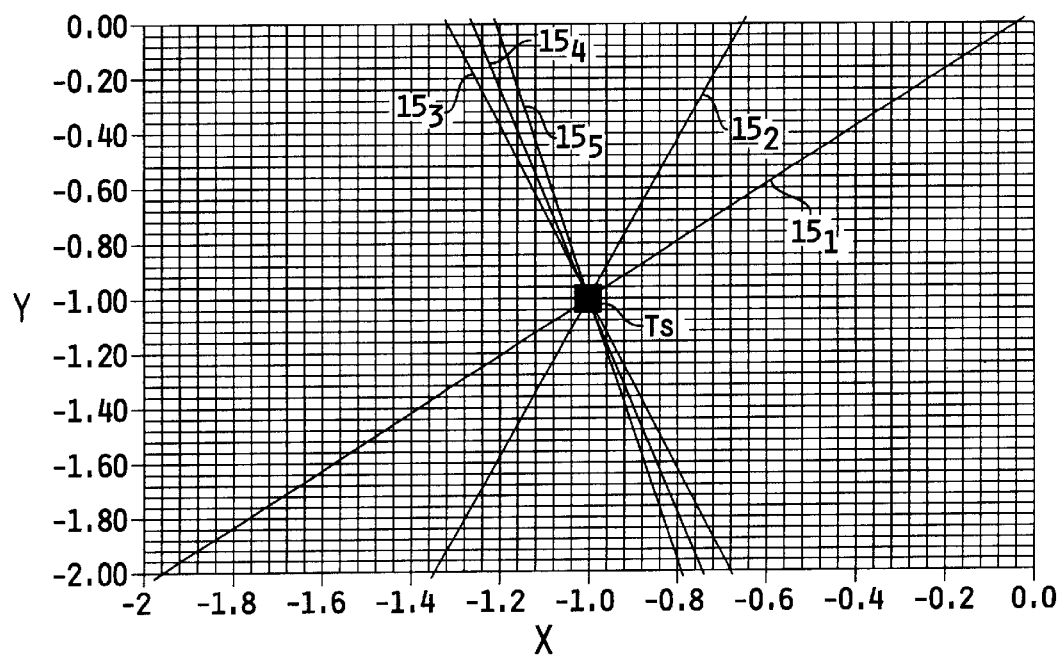
FIG. 2 is a plot of a number of system equations generated by the signal processing system of FIG. 1 illustrating a unique solution thereof under ideal signal measurement conditions.
Figure 3:
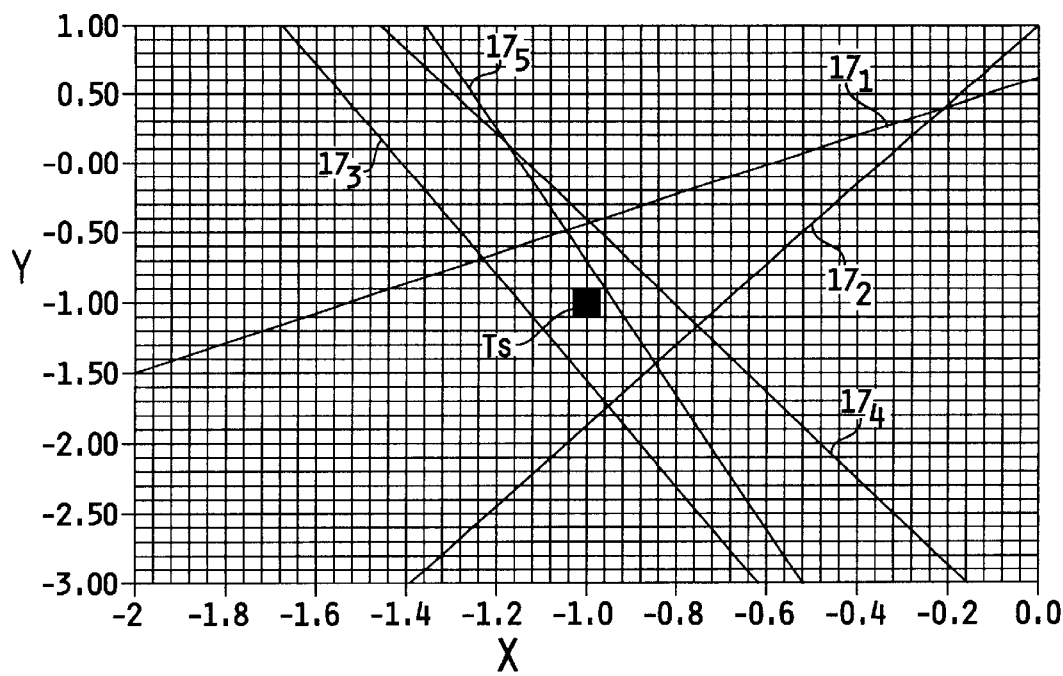
FIG. 3 is a plot of a number of system equations generated by the signal processing system of FIG. 1 illustrating inaccuracy effects on the solution thereof under typical signal measurement conditions.

For the purposes of promoting an understanding of the principles of the invention, reference will now be made to one preferred embodiment illustrated in the drawings and specific language will be used to describe the same. It will nevertheless be understood that no limitation of the scope of the invention is thereby intended, such alterations and further modifications in the illustrated embodiment, and such further applications of the principles of the invention as illustrated therein being contemplated as would normally occur to one skilled in the art to which the invention relates.

Figure 4:
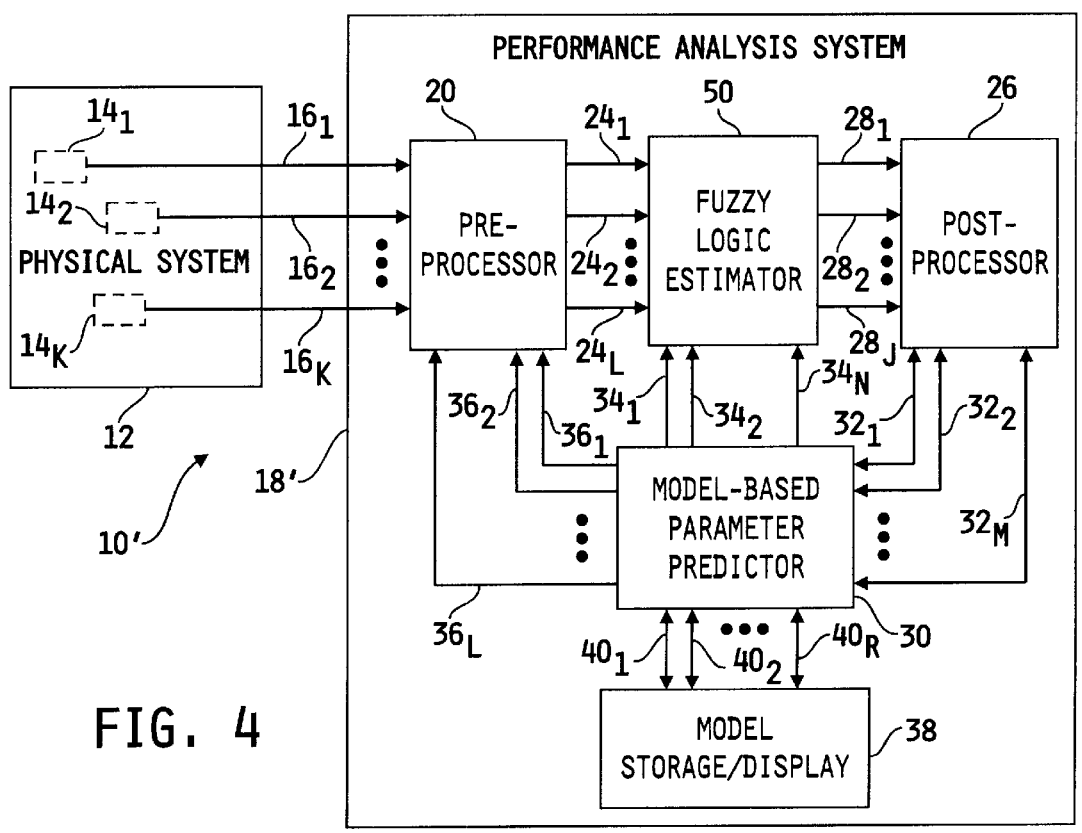
FIG. 4 is a diagrammatic illustration of a signal processing system similar to that shown in FIG. 1 substituting one preferred embodiment of a fuzzy logic estimator for the equation solver block of FIG. 1, in accordance with the present invention.

Referring now to FIG. 4, one preferred embodiment of a signal processing system 10', in accordance with the present invention, is shown. Although for purposes of the present invention, system 10' may be any signal processing system operable to determine a set of unknown parameter values from a plurality signal measurements indicative of operating conditions within a physical system, system 10' is illustrated in FIG. 4 as a physical system modeling application similar in many respects to the physical system modeling application 10 of FIG. 1. For example, like system 10 of FIG. 1, system 10' includes a physical system 12 having a number of physical processes associated therewith. A number, K, of physical process sensors $14_1$-$14_K$ are suitably disposed relative to system 12, wherein K may be any positive integer. Sensors $14_1$-$14_K$ are generally operable to sense operating conditions associated with physical system 12, and produce resulting operating condition signals ($c_i$, i=1, ..., K) on corresponding signal paths $16_1$-$16_K$.

System 10' further includes a performance analysis system 18' receiving the operating condition signals on signal paths $16_1$-$16_K$ and determining predicted performance parameters therefrom, wherein system 18' is similar in many respects to the performance analysis system 18 of FIG. 1. For example, system 18' includes a pre-processing unit 20 having a first set of inputs electrically connected to the various physical process sensors $14_1$-$14_K$ via signal paths $16_1$-$16_K$, a second number, L, of inputs electrically connected to a corresponding number, L, of outputs of a model-based parameter predictor block 30 via signal paths $36_1$-$36_L$, and a number, L, of outputs electrically connected to a fuzzy logic estimator 50 via a corresponding number, L, of signal paths $24_1$-$24_L$, wherein L may be any positive integer. Generally, K>L, and the pre-processor unit 20 is operable to combine one or more of the operating condition signals $c_i$, i=1, ..., K) to form a number, L, of corresponding operating parameter signals $p_j$, j=1, ..., L. The model-based parameter predictor block 36 is operable to produce L model parameter values $mp_j$, j=1, ..., L, wherein the model parameter values $mp_j$, j=1, ..., L correspond to the computed model values of the operating parameter signals $p_j$, j=1, ..., L. The pre-processor unit 20 is, in turn, operable to compute a number, L, of parameter delta values $\delta p_j$(j=1, ..., L), wherein $\delta p_j$=$p_j$−$mp_j$, j=1, ..., L, and to produce the parameter delta values $\delta p_j$ on corresponding signal paths $24_1$-$24_L$.

In accordance with the present invention, the equation solver 22 of FIG. 1 is replaced by a fuzzy logic estimator block 50 which is preferably has a first set of inputs receiving the parameter delta values $\delta p_j$(j=1, ..., L) on signal paths $24_1$-$24_L$, a second set of inputs receiving a number of unknown variables $\delta x_i$ and corresponding weighting factors $W_{ji}$ from the model-based parameter predictor block 30 via a number, N, of signal paths, wherein N may be any positive integer, and a set of outputs producing a number, J, of estimated values of the unknown variables $\delta x_i$, i=1, ..., J. As described hereinabove in the BACKGROUND section, the unknown variables $\delta x_i$, i=1, ..., J represent functional distortions of the various components of physical system 12. For example, where performance analysis system 18' represents an engine performance modeling application, the functional distortions $\delta x_i$ may correspond to compressor efficiency, turbine efficiency, flow capacity, pressure ratio, pressure drop, and the like, relating to one or more corresponding components of physical system 12. The weighting factors $W_{ji}$ correspond to the equation constants in the system of equations forming the particular model contained within the model-based parameter predictor block 30, wherein block 30 may include any number of models. In general, the fuzzy logic estimator 50 is thus operable to solve a system of equations of the form given by equation (1) in the BACKGROUND section.

The fuzzy logic estimator 50 is electrically connected to a set of inputs of a post-processor unit 26 via signal paths $28_1$-$28_J$, and a set of inputs/outputs of post processor unit 26 are electrically connected to a corresponding set of inputs/outputs of the model-based parameter predictor 30 via a number, M, of signal paths $32_1$–$32_M$. In general, blocks 12, 20, 50, 26 and 30 form a closed-loop equation solving system using an iterative approach to compute a solution to the system of equations defined thereby. In this regard, the post-processor unit 26 is preferably operable to receive from the model-based parameter predictor block 30 the estimated $\delta x_i$ values from the previous iteration, to receive from the fuzzy logic estimator 50 the estimated $\delta x_i$ values from the present iteration, and compute an error vector $\epsilon_k = \delta x_k - \delta x_{k-1}$, wherein k=iteration number. The post-processor block 26 is operable to halt the iterative equation solving process when $\epsilon_k$ is within a desired range, and to accordingly notify the model-based parameter predictor 30 via one of the signal paths $32_1$–$32_M$. Alternatively, the post-processor block 26 may be omitted and signal paths $28_1$–$28_J$ may lead directly to J corresponding inputs of the model-based parameter predictor 30. In this alternative embodiment, the pre-processor block 20 is further preferably operable to compare the various operating parameter values $p_j$, j=1, . . . , L with the model parameter values $mp_j$, j=1, . . . , L, and compute an error vector $\epsilon_k = p_k - mp_{k-1}$, wherein k=iteration number. In this embodiment, the pre-processor block 20 is operable to halt the iterative equation solving process when $\epsilon_k$ is within a desired range.

The model-based parameter predictor 30 is electrically connected to a model storage and/or display unit 38 via a number, R, of signal paths $40_1$–$40_R$, wherein R may be any positive integer. Unit 38 may include a display and/or printer for viewing the results of the model, and may further include a data storage unit for recording the model results.

Unlike the Newton-type iterative technique for solving the system of $\delta x_i$ equations described in the BACKGROUND section, the fuzzy logic estimator block 50 of FIG. 4 is preferably configured to process a rectangular matrix of $\delta x_i$ equations with L>J such that the rectangular matrix represents an over-determined system of equations. While the extra equations are typically redundant, and a such a system of equations normally does not have a solution, each of the L equations provided to block 50 of FIG. 4 have a high degree of reciprocal consistency because they are all based on measurements of the same physical system 12. Taking into consideration this high degree of reciprocal consistency, a new class of solutions is defined herein that may not necessarily satisfy each of the individual system equations, but is instead located within the vicinity of the exact solutions of each of the square-matrix combinations defined by the overdetermined system of equations. By introducing additional equations, based on new measured parameter values, distortions due to low measurement accuracy may be progressively minimized. In a preferred embodiment of the present invention, the unique solution of a determined system is accordingly replaced at each iteration by the most probable solution of an over-determined system, wherein the fuzzy logic estimator block 50 is configured to convert the information provided by the additional equations into an increased accuracy of the solution estimate.

Before describing in detail the operation of the fuzzy logic estimator block 50 of the present invention, it would be useful to first set out, and provide a numerical example of, a generalized process flow for a typical fuzzy expert system. In general, a fuzzy expert system is an expert system operable to process data by replacing Boolean logic rules with a collection of fuzzy membership functions and rules. An example rule in a fuzzy expert system may be of the form:

If x is low and y is high, then z is low,
where x and y are input variables, z is an output variable, "low" is a membership function defined on x and z, and "high" is a membership function defined on y. The rule's premise describes the degree to which the rule applies, while the rule's consequent assigns a membership function to the output variable(s), wherein the set of rules in a fuzzy expert system is known as the rule base or knowledge base.

Data processing in a fuzzy expert system may be described as accomplishing the following steps:

1. FUZZIFICATION—The membership functions defined on the input variables are applied to the actual values of the input variables to determine the degree of truth for each rule premise.

2. INFERENCE—The truth value for the premise of each rule is computed and applied to its consequent. This results in one fuzzy subset to be assigned to each output variable. Typically, the inference step is implemented either as a MIN or PRODUCT function. In MIN inferencing, the output membership function is clipped off at a height corresponding to the rule premise's computed degree of truth (e.g., fuzzy logic AND), while in PRODUCT inferencing the output membership function is scaled by the rule premise's computed degree of truth.

3. COMPOSITION—All of the fuzzy subsets assigned to each output variable are combined together to form a single fuzzy output subset for each output variable. Typically, the composition step is implemented either as a MAX or SUM function. In MAX composition, the combined output fuzzy subset is constructed by taking the pointwise maximum over all of the fuzzy subsets assigned to the output variable by the inference rule (e.g., fuzzy logic OR), while in SUM composition the combined output fuzzy subset is constructed by taking the pointwise sum over all of the fuzzy subsets assigned to the output variable by the inference rule.

4. DEFUZZIFICATION—The fuzzy output subset for each output variable converted to a unique solution. A number of defuzzification techniques are known, although two of the more commonly used techniques are the MAXIMUM technique and the CENTROID technique. With the maximum technique, a concrete value of the output variable is chosen as a function of the maximum truth value of the fuzzy output subset. With the centroid technique, the concrete value of the output variable is chosen as the center of gravity of the fuzzy output subset.

As a numerical example of the foregoing fuzzy expert system process, assume that the variables x, y and z all take on values in the in the interval [1, 10], and that the following membership functions and rules are defined:

Low($t$)=1−($t$/10)

High($t$)=$t$/10

Rule 1: if x is low and y is low, then z is high

Rule 2: if x is low and y is high, then z is low

Rule 3: if x is high and y is low, then z is low

Rule 4: if x is high and y is high, then z is high

In the FUZZIFICATION step, the membership functions defined on the input variables are applied to their actual values to determine the degree of truth for each rule premise. The degree of truth for a rule's premise will be referred to as its ALPHA. Applying the FUZZIFICATION step to x=y=0 yields, for example, ALPHA1=1, and ALPHA2= ALPHA3=ALPHA4. With x=0 and y=3.2, ALPHA1=0.68, ALPHA2=0.32, and ALPHA3=ALPHA4=0. With x=3.2 and y=3.1, ALPHA1=0.68, ALPHA2=0.31, ALPHA3=0.32 and ALPHA4=0.31, etc.

In the INFERENCE STEP, the truth value for the premise of each rule is computed and applied to the consequent part of each rule. This results in one fuzzy subset to be assigned to each output variable for each rule. Using MIN inferencing for rule 1 with x=0.0 and y=3.2, for example, the premise degree of truth is 0.68, and the fuzzy output subset in this case is defined by the membership function:

Rule1(z)={z/10;z≦6.8 0.68; z≧6.8}.

For the same conditions using PRODUCT inferencing, for example, the rule 1 fuzzy output subset in this case is defined by the membership function:

Rule1(z)=0.68*z.

In the COMPOSITION step, all of the fuzzy subsets assigned to each output variable are combined to form a single fuzzy subset for each output variable. In MAX composition, the combined fuzzy subset is constructed by taking the pointwise maximum over all of the fuzzy subsets assigned to the output variable by the inference step. For example, assuming again that x=0.0 and y=3.2, MIN inferencing would assign the following four fuzzy subsets to z:

Rule1(z)={z/10; z≦6.8 6.8; z≧6.8}
Rule2(z)={0.32; z≦6.8 1−z/10; z≧6.8}
Rule3(z)=0.0
Rule4(z)=0.0.

MAX composition would then result in the fuzzy subset:

Fuzzy(z)={0.32; z≦3.2 z/10; 3.2≦z≦6.8 0.68; z≧6.8}.

For the same input conditions, PRODUCT inferencing would result in the following for fuzzy subsets to z:

Rule1(z)=0.68*z
Rule2(z)=0.32−0.032z
Rule3(z)=0.0
Rule4(z)=0.0.

SUM composition would then result in the fuzzy subset:

Fuzzy(z)=0.32+0.036*z.

In the DEFUZZIFICATION step, the fuzzy subset produced by the COMPOSITION step is converted to a single, unique number; or a crisp value. A number of defuzzification techniques are known, and two of the more common techniques were described hereinabove as the MAXIMUM and CENTROID techniques. In the CENTROID technique, the moment of the fuzzy function Fuzzy(z) is divided its area. For example, using the PRODUCT inferencing and SUM composition step examples above, the moment of Fuzzy(z) is the integral of z*Fuzzy(z) dz from 0 to 10, which is [(0.16*10*10)+0.012*10*10*10)]=28. The area of Fuzzy(z) is the integral of Fuzzy(z) dz from 0 to 10, which is [(0.32*10)+(0.018*100)]=5. The CENTROID defuzzification step produces as its crisp value, z=28/5=5.6. In MAXIMUM defuzzification, one of the variable values at which the fuzzy subset Fuzzy(z) has its maximum truth value is chosen as the crisp value for the output value. A number of variations of the MAXIMUM technique exist that differ only in what they do when there is more than one variable value at which the maximum truth value occurs. One common variation of the MAXIMUM technique is the AVERAGE-OF-MAXIMA technique which computes the average of the variable values at which the maximum truth value occurs. For example, using the MAX inferencing and MIN composition step examples above, the AVERAGE-OF-MAXIMA defuzzification technique produces as its crisp value z=8.4.

Referring again to FIG. 4, the over-determined system of equations produced by pre-processor block 20 has J unknowns $\delta x_i$ that correspond to the functional distortions of the various monitored components of physical system 12, and L linear equations (L>J) that correspond to the measured parameters of physical system 12. The over-determined system of equations can thus be written as:

$$w_{1j}\delta x_1 + w_{2j}\delta x_2 + \ldots + w_{Jj}\delta x_J = \delta p_j \quad (4)$$

where:

j=1, ..., L, L>J, $\delta x_1$ represents a distortion (delta) of one of the physical system functions (e.g., compressor efficiency, pressure ratio, etc. of, for example, a gas turbine), $w_{ij} = \partial p_j/\partial x_i$ is an element of the Jacobian (sensitivity) matrix, $p_j$ represents one of the measured parameters of physical system 12 as well of one of the parameters utilized in the model, and $\delta p_j$ represents the delta between the measured value and the calculated value of the parameter.

Compared with the parameter's delta value, the accuracy of the partial derivatives is quite high, such that $\delta p_j$ may be regarded as the only term in equation (4) that is affected by the measurement noise. In order to quantify this noise and qualify the parameter measurement, the fuzzy logic estimator block 50 of FIG. 4 is used to estimate an accurate solution to the over-determined system of equations. In principle, the fuzzy logic estimator block 50 of the present invention adds an extra dimension; i.e., the fuzzy dimension, which encapsulates the quality of measurement and produces a value that is the most probable solution of the over-determined system of equations. The four general steps of the known fuzzy expert system just described, are formally applied in the present invention, but with substantial changes in their scope.

Figure 5:
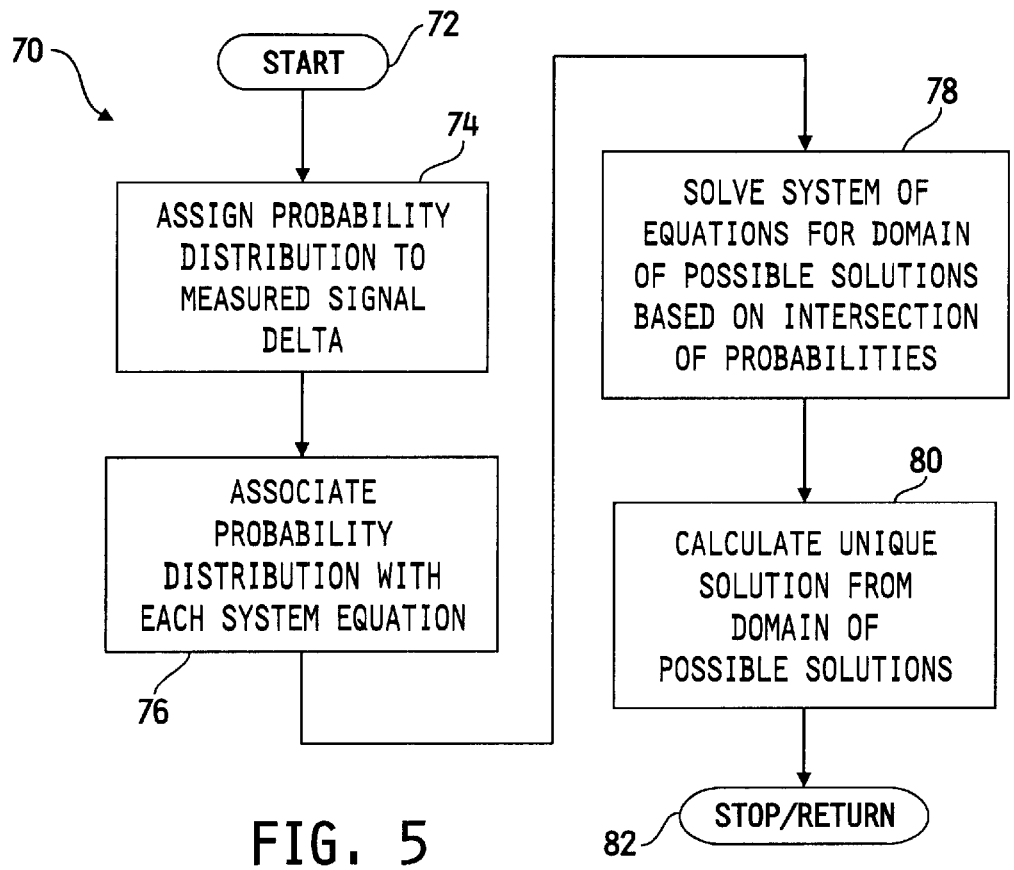
FIG. 5 is a flowchart illustrating one preferred embodiment of a software algorithm for implementing the fuzzy logic estimator block of the system of FIG. 4.

Referring now to FIG. 5, a flowchart is shown illustrating one preferred embodiment of a software algorithm 70 for carrying out the fuzzy logic estimator function illustrated by block 50 of FIG. 4. In accordance with the present invention, the fuzzy logic estimator block 50 is preferably included within a microprocessor or other general purpose computer included within the performance analysis system 18', and is operable to execute algorithm 70 of FIG. 5. Algorithm 70 is operable to estimate a solution to a set of system equations having as inputs at least some of the physical system signals carried by signal paths $16_1$–$16_K$, and includes four high-level steps that correspond roughly to the FUZZIFICATION, INFERENCE, COMPOSITION and DEFFUZIFICATION steps common to known fuzzy expert systems of the type described hereinabove. Unlike known fuzzy expert systems, however, at least some of the four steps of algorithm 70 differ significantly from those described in the example hereinabove. In any case, algorithm 70 will be described as being carried out; i.e., executed, by block 50 of the performance analysis system 18', it being understood that block 50 is preferably included within a microprocessor or other general purpose computer capable of operation as will be described hereinafter.

Figure 6:
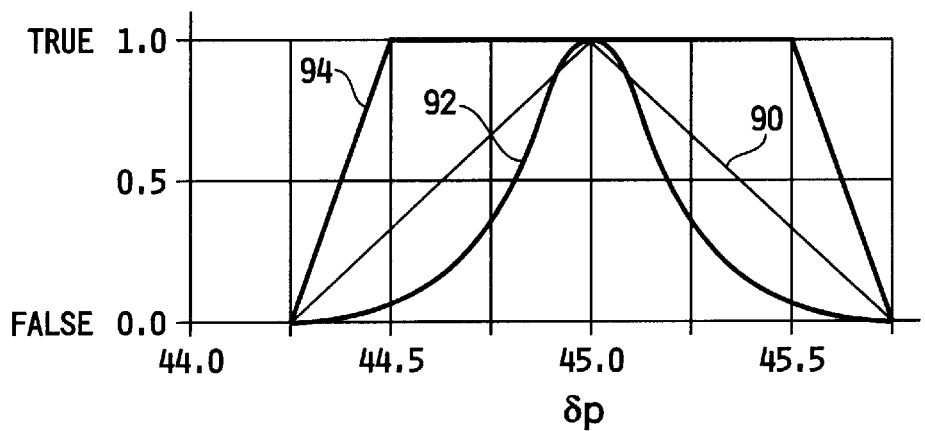
FIG. 6 is a probability distribution plot illustrating a number of embodiments for implementing the first step of the flowchart of FIG. 5.

Algorithm 70 begins at step 72, and at step 74 block 50 is operable to assign a probability distribution to each of the measured signal delta ($\delta p_j$) values; i.e., the differences or deltas between the parameter values $p_j$ and their corresponding modeled or calculated values $mp_j$. Step 74 corresponds roughly to the FUZZIFICATION step described hereinabove, but differs from the above example in that the parameter delta values are no longer single-valued, but are instead replaced with a probability distribution function preferably having a maximum probability value coincident with the original δp$_j$ values. The present invention contemplates that that the probability function used at step 74 may be any known probability function, wherein three example probability distribution functions are illustrated in FIG. 6. In one embodiment, the probability function may be a symmetrical, triangular probability distribution function centered over the original δp$_j$ values; e.g., 45.0 as shown in FIG. 6. Alternatively, a symmetrical, normal probability distribution function 92 may be used and centered over the various original δp$_j$ values; here again, 45.0. Alternatively still, a symmetrical, trapezoidal probability distribution function 94 may be used and centered over the various original δp$_j$ values (e.g., 45.0). It is to be understood that the spread (deviation) in the chosen probability function over signal values adjacent to the measured signal value will generally be a function of the magnitudes of the signal measurement errors as well as the desired system solution accuracy. For example, in the case of a normal distribution, the probability distribution function used to replace the original parameter delta values δp$_j$ may take the form:

$$\rho(t_j, \mu_j, \sigma_j) = \exp[-(t_j - \mu_j)^2 / 2\sigma_j] \quad (5)$$

where, t$_j$ is the parameter's local axis,

σ$_j$ is the standard deviation, and $\mu_j = \delta p_j$ is the mean value which equals the nominal value itself.

It is to be understood that equation (5) may alternatively be chosen to define another known probability distribution function, such as a triangular, trapezoidal, rectangular, etc. distribution, wherein the choice of such an equation and its parameters are within the knowledge of a skilled artisan. In any case, it should further be understood that the probability functions illustrated in FIG. 6 are provided only by way of example, and that the present invention contemplates using any known symmetrical or non-symmetrical probability distribution functions, wherein any such probability distribution function preferably has its maximum probability value aligned (coincident) with the values of each of the various measured signal deltas.

From step 74, execution of algorithm 70 advances to step 76 where block 50 is operable to associate the probability distribution function of step 74 with each of the system equations, thereby creating a partially true subset around each equation. The result is a non-zero vicinity around the surface (hyper-plane) described by equation (4) above. Using the probability distribution function described by equation (5), for example, step 76 yields the following function for each system equation:

$$f(T_j, \mu_j, \sigma_j) = \exp[-(T_j - \mu_j)^2/2\sigma_j] = \exp[-(\Sigma w_{ij}\delta x_i - \delta p_j)^2/2\sigma_j] \quad (6)$$

where, $T_j = \Sigma^L_{i=1} w_{ij} \delta x_i$, and $\mu_j = \delta p_j$.

Step 76 corresponds roughly to the INFERENCE step described hereinabove by assigning a number of fuzzy subsets to each output variable.

From step 76, execution of algorithm 70 advances to step 78 where block 50 is operable to solve the system of "J" equations for a domain of possible solutions defined by an intersection of the probability distribution functions associated with the various system equations. Assuming all of the events are reciprocally independent, the intersection of those events leads to a multiplication of the various probability distribution functions such that the domain of possible solutions is defined as a product of each of the various probability distribution functions associated with the system of equations. Step 78 corresponds roughly to the COMPOSITION step described hereinabove by combining all of the fuzzy subsets assigned to each output variable into a single fuzzy subset for each output variable. The fuzzy domain that includes all of the possible solutions is bordered by the surface ψ(δx), which is defined by the equation:

$$\psi(\delta x) = \Pi^J_{j=1} f_j(\delta x) \quad (7).$$

Figure 7A:
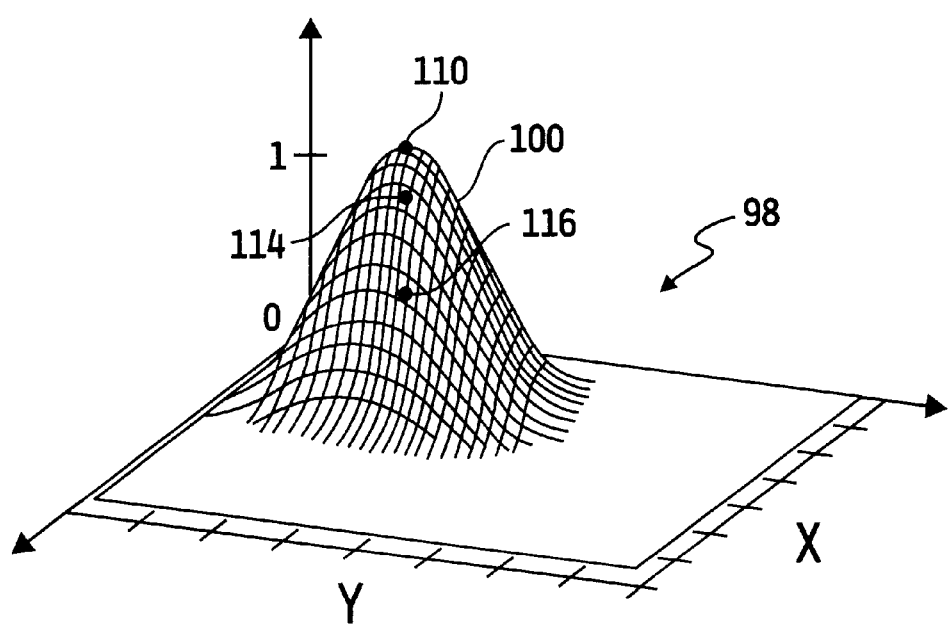
FIG. 7A is a solution domain plot illustrating one example of the third and fourth steps of the flowchart of FIG. 5 using a normal probability distribution for the first step.
Figure 7B:
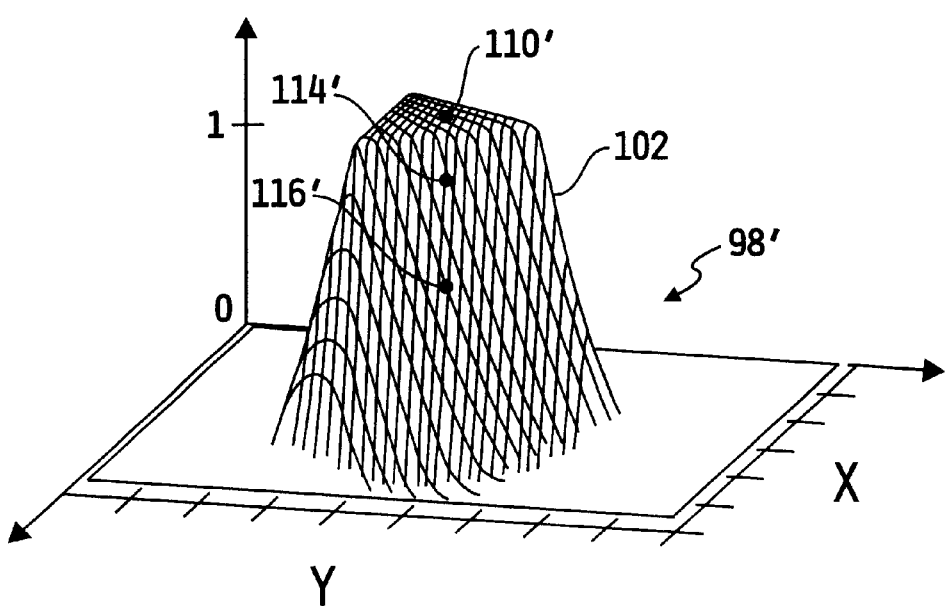
FIG. 7B is a solution domain plot illustrating another example of the third and fourth steps of the flowchart of FIG. 5 using a trapezoidal probability distribution for the first step.

Referring to FIG. 7A, an example is illustrated with L=arbitrary and J=2 (unknown variables x and y) using a normal probability distribution associated with the system of equations. The resulting plot 98 defines a domain 100 of possible solutions represented by an intersection of the various probability distribution functions associated with the system of equations. Referring to FIG. 7B, another example is illustrated with the same input/output conditions but using a trapezoidal probability distribution associated with the system of equations. The resulting plot 98' defines a domain 102 of possible solutions represented by an intersection of the various probability distribution functions associated with the system of equations.

Execution of algorithm 70 advances from step 78 to step 80 where block 50 is operable to calculate a unique; i.e., crisp, solution to the set of system equations as the most probable solution from the domain of possible solutions defined by step 76. Step 78 thus corresponds to the DEFUZZIFICATION step described hereinabove and may be accomplished in accordance with any of a number of known techniques therefore. For example, referring again to FIGS. 7A and 7B, a strict MAXIMUM technique may be used wherein the unique solution is chosen as the values of x and y at which the domain of possible solutions has a maximum truth value 110 (FIG. 7A) and 110' (FIG. 7B). Alternatively, an AVERAGE-OF-MAXIMA technique may be used wherein the unique solution is chosen as the values of x and y at which the domain of possible solutions represents the average 114 (FIG. 7A) and 114' (FIG. 7B) of the variable values at which the maximum truth value occurs. Alternatively still, a centroid technique may be used wherein the unique solution is chosen as the values of x and y at which the domain of possible solutions has its center of gravity 116 (FIG. 7A) and 116' (FIG. 7B). This solution is preferably determined by dividing the moment of the domain of possible solutions by its area as described hereinabove, and as defined by the equation:

$$c_i = \int_D \delta x_i \psi_G(\delta x) dw / \int_D \psi_G(\delta x) dw; \ i = 1, 2, \ldots J \quad (8)$$

where D is the domain of possible solutions. In any case, algorithm 70 advances from step 80 to step 82 where it stops or returns to its calling routine.

Figure 8:
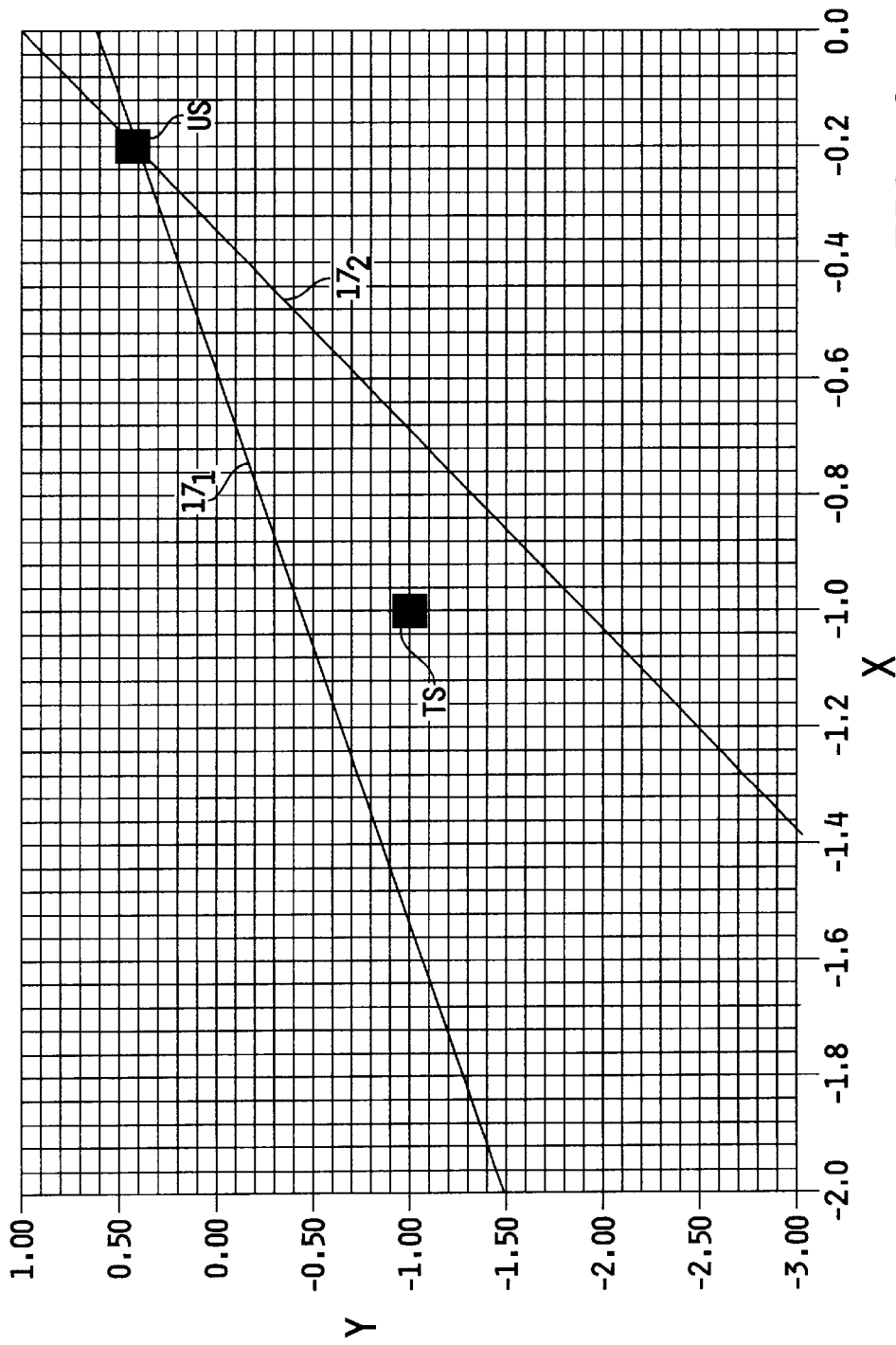
FIG. 8 is a plot of two system equations generated by the known signal processing system of FIG. 1 illustrating an inaccurate unique solution produced by the equation solver block.
Figure 9:
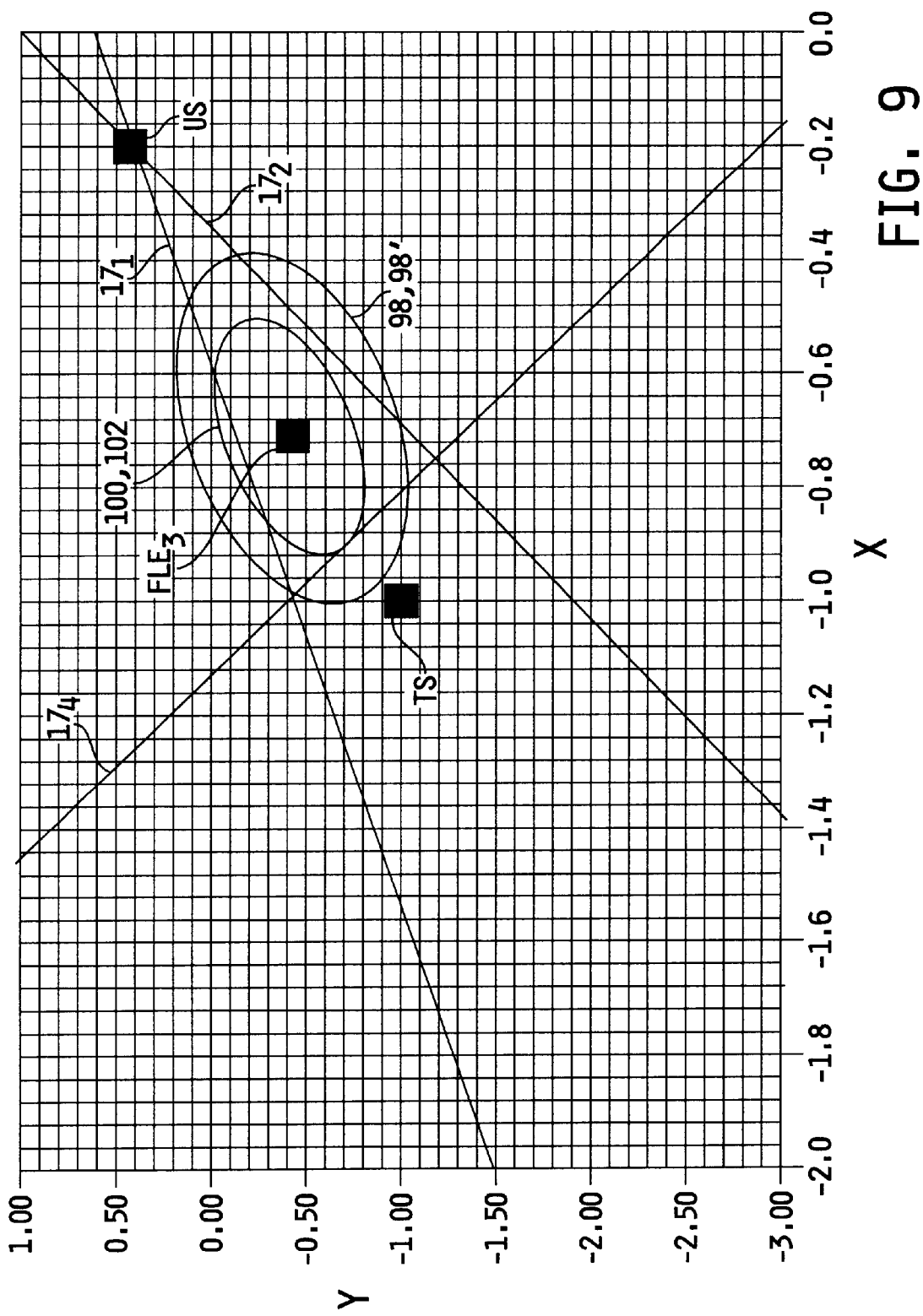
FIG. 9 is a plot of three system equations generated by the signal processing system of FIG. 4 illustrating an improvement in the solution produced by the fuzzy logic estimator block, in accordance with the present invention.

In a general sense, the accuracy of the fuzzy logic estimator block 50 of the present invention increases as the number of system equations increases, thereby leading to the preferable implementation of an overdetermined system of equations. For example, referring to FIG. 8, a plot of two system equations 17$_1$ and 17$_2$ with two unknowns (x and y) is shown illustrating the unique solution (US) produced by the prior art equation solver block 22 of FIG. 1. With inaccuracies and/or spurious readings resulting from inherent limitations of the physical system signal measuring sensors, it will be noted that the unique solution (US) produced by the equation solver block 22 of FIG. 1 deviates significantly from the true solution (TS). Referring to FIG. 9, a third system equation 17$_3$ is added, and the plot of FIG.

Figure 10:
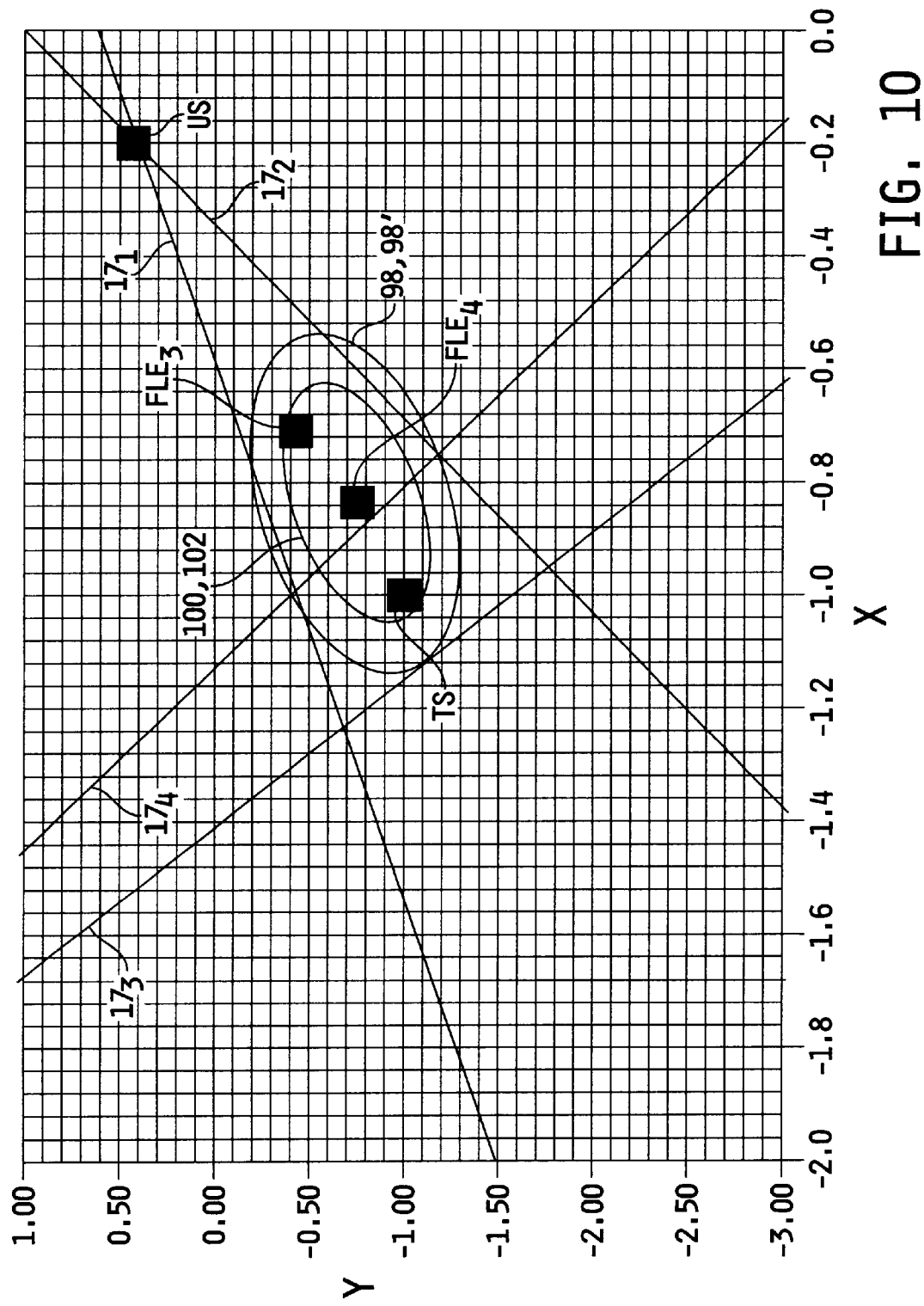
FIG. 10 is a plot of four system equations generated by the signal processing system of FIG. 4 illustrating a further improvement in the solution produced by the fuzzy logic estimator block, in accordance with the present invention.
Figure 11:
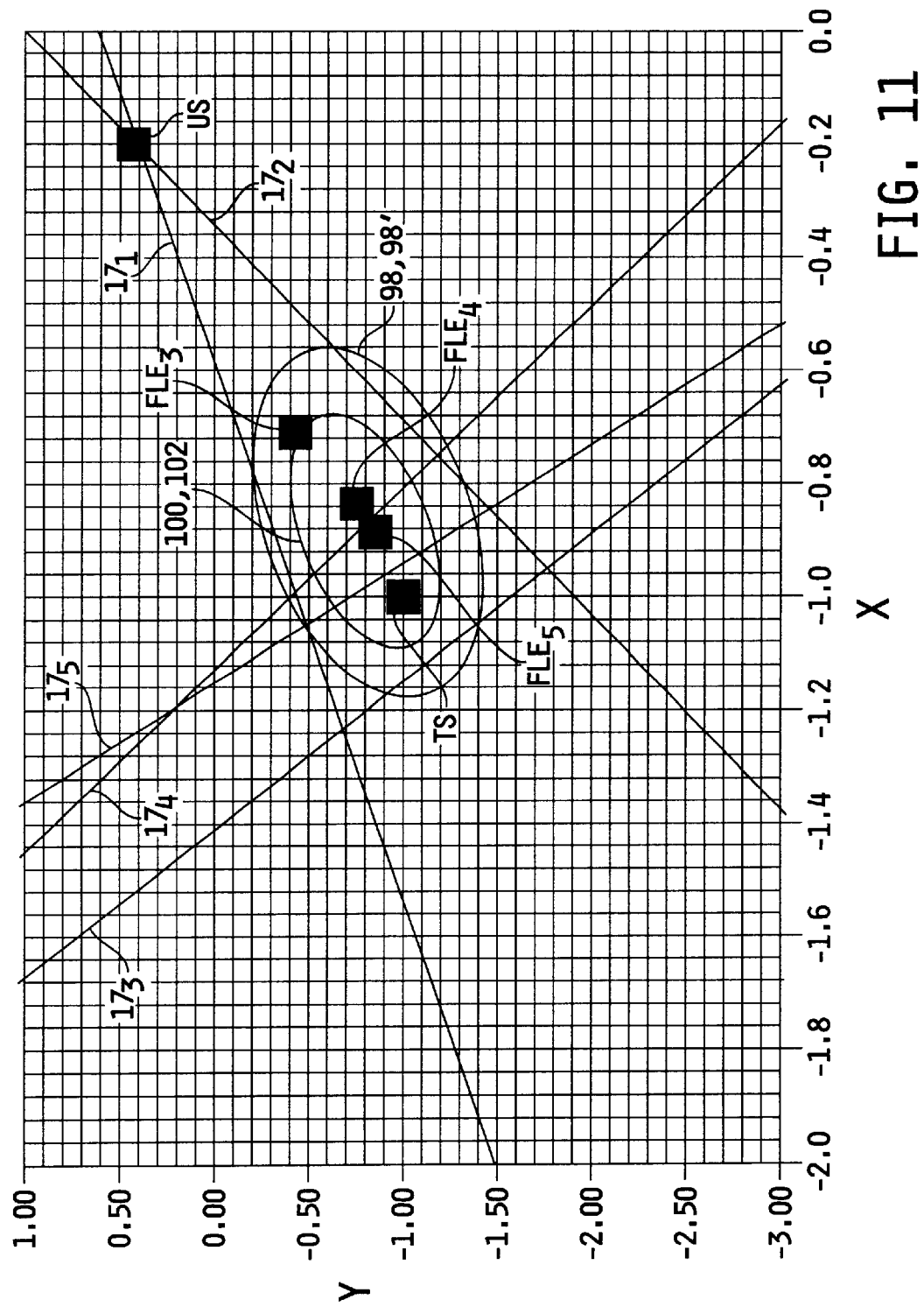
FIG. 11 is a plot of five system equations generated by the signal processing system of FIG. 4 illustrating still a further improvement in the solution produced by the fuzzy logic estimator block, in accordance with the present invention.
Figure 12:
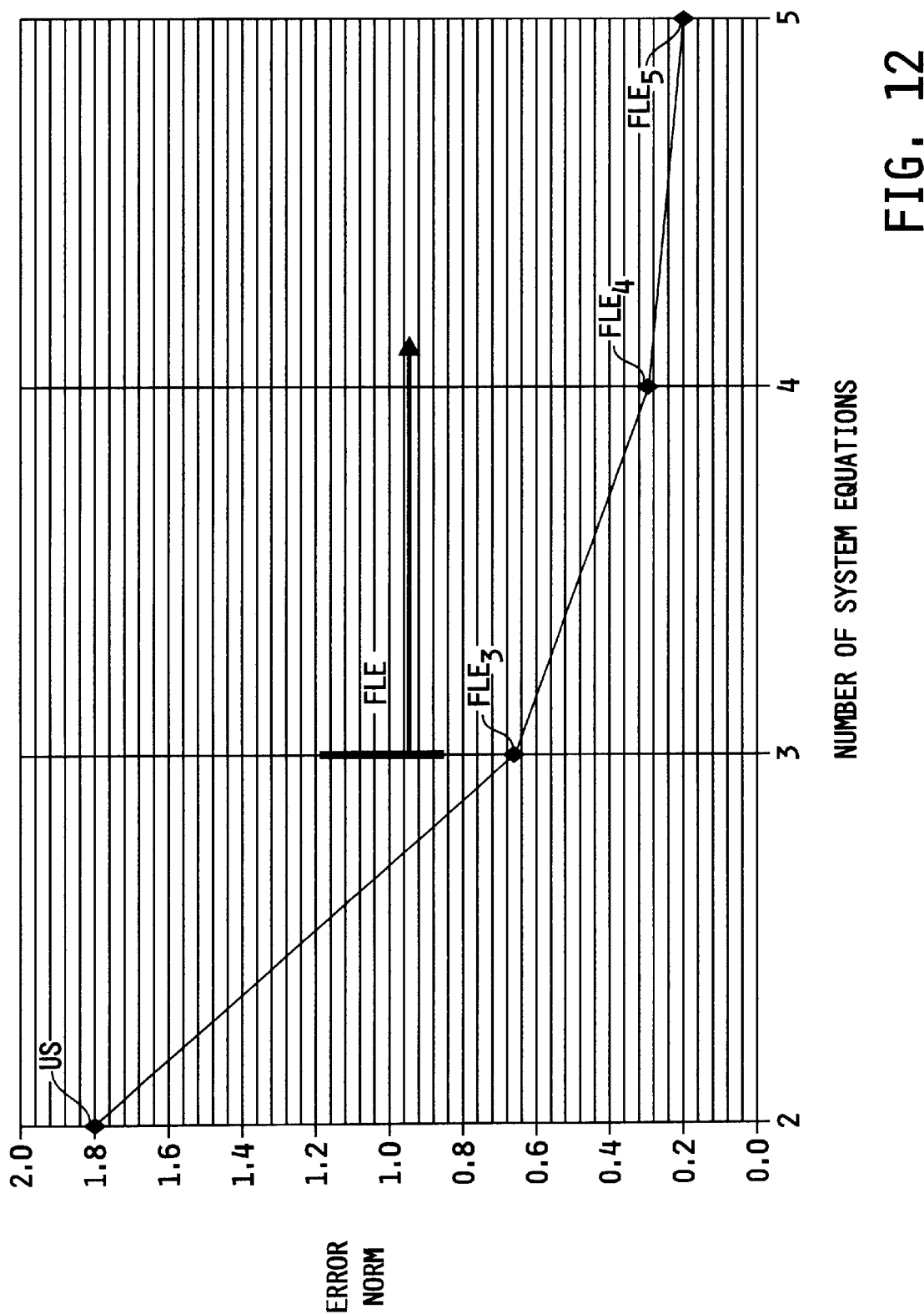
FIG. 12 is a plot of normalized solution error vs. number of system equations used in the fuzzy logic estimator block of FIG. 4 illustrating an improvement in the normalized solution error with an increasing number of system equations used.

9 now illustrates the estimated solution produced by the fuzzy logic estimator block 50 of the present invention. The solution space 98, 98' is shown as containing the domain of possible solutions 100, 102 which defines the 3-equation fuzzy logic solution estimate $FLE_3$. It will be noted with reference to the normalized error plot of FIG. 12 that the solution offered with the 3-equation fuzzy logic estimate reduces the solution error by approximately 50% over that of FIG. 8. Referring to FIG. 10, a fourth system equation $17_4$ is added, and the plot of FIG. 10 as well as the normalized error plot of FIG. 12 illustrates that the estimated solution produced by the 4-equation fuzzy logic solution estimate $FLE_4$ offers a further improvement over that produced by the 3-equation estimate $FLE_3$. Referring to FIG. 11, a fifth equation $17_5$ is added, and the plot of FIG. 11 as well as the normalized error plot of FIG. 12 illustrates that the estimated solution produced by the 5-equation fuzzy logic solution estimate $FLE_5$ offers still a further improvement over that produced by the 4-equation estimate $FLE_4$. As a practical matter, those skilled in the art will recognize that a tradeoff exists between computational complexity and estimation accuracy, and these factors must therefore be taken into consideration when choosing the number of system equations used in the fuzzy logic estimate; i.e. the degree to which the system of equations is overdetermined.

While the invention has been illustrated and described in detail in the foregoing drawings and description, the same is to be considered as illustrative and not restrictive in character, it being understood that only one preferred embodiment thereof has been shown and described and that all changes and modifications that come within the spirit of the invention are desired to be protected.

What is claimed is:

1. A method of minimizing signal measurement inaccuracy effects in a signal processing system, comprising:

assigning a probability distribution to each of a first number of delta values to form a corresponding first number of probability distribution functions, said delta values representing differences between pairs of measured signal values and corresponding model values;

associating at least some of said first number of probability distribution functions with each equation in a system of equations defining a second number of unknown parameter values;

solving said system of equations for a domain of possible solutions; and determining a unique solution for said second number of unknown parameter values from said domain of possible solutions.

2. The method of claim 1 wherein said probability distribution is a normal probability distribution.

3. The method of claim 1 wherein said probability distribution is a trapezoidal probability distribution.

4. The method of claim 1 wherein said probability distribution is a triangular probability distribution.

5. The method of claim 1 wherein said probability distribution is a rectangular probability distribution.

6. The method of claim 1 wherein said probability distribution is a nonsymmetrical probability distribution.

7. The method of claim 1 wherein the solving step includes forming said domain of possible solutions as a product of probability distribution functions associated with each equation in said system of equations.

8. The method of claim 1 wherein the determining step includes determining said unique solution as a function of a maximum value of said domain of possible solutions.

9. The method of claim 1 wherein the determining step includes determining said unique solution as a centroid of said domain of possible solutions.

10. The method of claim 1 wherein said first number is greater than said second number such that said system of equations represents an over-determined system of equations.

11. The method of claim 1 wherein the solving step includes defining said domain of possible solutions as an intersection of said probability distribution functions associated with each equation in said system of equations.

12. A method of minimizing signal measurement inaccuracy effects in a signal processing system, comprising:

measuring a plurality of signal values;

computing a first number of delta values each representing a difference between one of said plurality of signal values and a corresponding model value;

assigning a probability distribution to each of said first number of said delta values to form a corresponding first number of probability distribution functions;

associating at least some of said first number of probability distribution functions with each equation in a system of equations defining a second number of unknown parameter values;

solving said system of equations for a domain of possible solutions; and determining a unique solution for said second number of unknown parameter values from said domain of possible solutions.

13. The method of claim 12 wherein the determining step includes determining said unique solution as a function of a maximum value of said domain of possible solutions.

14. The method of claim 12 wherein the determining step includes determining said unique solution as a centroid of said domain of possible solutions.

15. The method of claim 12 wherein said first number is greater than said second number such that said system of equations represents an over-determined system of equations.

16. The method of claim 12 wherein said probability distribution is one of a normal probability distribution, a trapezoidal probability distribution, a triangular probability distribution and a rectangular probability distribution function.

17. The method of claim 12 wherein said probability distribution is a non-symmetrical probability distribution.

18. The method of claim 12 wherein the solving step includes defining said domain of possible solutions as an intersection of said probability distribution functions associated with each equation of said system of equations.

19. A system for minimizing signal measurement inaccuracy effects in a signal processing system, comprising:

a plurality of sensors producing a corresponding plurality of signal values indicative of operating conditions of a physical system; and a signal processing system receiving said plurality of signal values, said signal processing system including:

means for assigning a probability distribution to each of a first number of delta values to form a corresponding first number of probability distribution functions, said delta values representing differences between pairs of measured signal values and corresponding model values;

means for associating at least some of said first number of probability distribution functions with each equation of a system of equations defining a second number of unknown parameter values;

means for solving said system of equations for a domain of possible solutions; and means for determining a unique solution for said second number of unknown parameter values from said domain of possible solutions.

20. The system of claim 19 wherein said first number is greater than said second number such that said system of equations defines an over-determined system of equations.

21. The system of claim 19 wherein said probability distribution is one of a normal probability distribution, a trapezoidal probability distribution, a triangular probability distribution and a rectangular probability distribution function.

22. The system of claim 19 wherein said probability distribution is a non-symmetrical probability distribution.

23. A system for minimizing signal measurement inaccuracy effects in a signal processing system, comprising:
   a first circuit receiving a plurality of measured signal values and producing a first number of delta values each as a difference between one of said plurality of measured signal values and a corresponding model value; and
   a second circuit assigning a probability distribution to each of said first number of delta values to form a corresponding first number of probability distribution functions, said second circuit associating at least some of said first number of probability functions with each equation of a system of equations defining a second number of unknown parameter values and solving said system of equations for a domain of possible solutions, said second circuit producing a unique solution for said second number of unknown parameters based on said domain of possible solutions.

24. The system of claim 23 wherein said second circuit is configured to solve said system of equations by defining said domain of possible solutions as an intersection of said probability distribution functions associated with each equation of said system of equations.

25. The system of claim 23 further including a third circuit operable to predict model parameters based on said second number of unknown parameters defining said unique solution.

26. The system of claim 25 further including a memory storing said predicted model parameters.

27. The system of claim 23 wherein said second circuit is configured to determine said unique solution as a function of a maximum of said domain of possible solutions.

28. The system of claim 23 wherein said second circuit is configured to determine said unique solution as a function of a centroid of said domain of possible solutions.

29. The system of claim 23 wherein said first number is greater than said second number such that said system of equations defines an over-determined system of equations.

30. The system of claim 23 wherein said probability distribution is one of a normal probability distribution, a trapezoidal probability distribution, a triangular probability distribution and a rectangular probability distribution function.

31. The system of claim 23 wherein said probability distribution is a nonsymmetrical probability distribution.

* * * * *